United States Patent [19]
Sugiura

[11] Patent Number: 5,819,824
[45] Date of Patent: Oct. 13, 1998

[54] CONNECTOR DEVICE FOR LIQUID CRYSTAL CELL

[75] Inventor: Isao Sugiura, Tokyo, Japan

[73] Assignee: Beldex Corporation, Tokyo, Japan

[21] Appl. No.: 613,262

[22] Filed: Mar. 8, 1996

[30] Foreign Application Priority Data

Dec. 4, 1995 [JP] Japan ................................ 7-339983
Dec. 8, 1995 [JP] Japan ................................ 7-345480

[51] Int. Cl.⁶ .......................................................... B65B 1/04
[52] U.S. Cl. ........................ 141/383; 141/5; 141/311 R; 141/386; 156/99; 349/189
[58] Field of Search ........................ 141/4, 5, 67, 311 R, 141/369, 370, 372, 382, 383, 386; 156/99; 349/189, 190

[56] References Cited

U.S. PATENT DOCUMENTS

| 4,148,128 | 4/1979 | Feldman ................................ 349/190 |
| 5,137,484 | 8/1992 | Bohannon ............................. 349/189 |

FOREIGN PATENT DOCUMENTS

| 62-141516 | 6/1987 | Japan . |
| 64-37529 | 2/1989 | Japan . |
| 7-244290 | 9/1995 | Japan . |

Primary Examiner—Henry J. Recla
Assistant Examiner—Steven O. Douglas
Attorney, Agent, or Firm—Fish & Richardson P.C.

[57] ABSTRACT

A connector device is connected to a liquid crystal cell having an edge portion formed as a stepped portion. This connector device includes a connector unit. The connector unit includes a body, and an elastic seal member received in a receiving recess of the body. The seal member has a projection. This projection is formed as a stepped portion corresponding in configuration to the stepped portion of the edge portion of the cell. That is, the projection of the seal member includes a first abutment surface which intimately contacts a first receiving surface of the cell, a second abutment surface which intimately contacts a second receiving surface of the cell, and a third abutment surface which intimately contacts a third receiving surface of the cell. The first and second abutment surfaces are in parallel relation to each other, and the third abutment surface is orthogonal to the first and second abutment surfaces. An association recess is formed in the third abutment surface. In a state where the connector device is connected to the cell, the association recess is faced with a port of the cell. A nozzle member extends through the seal member, and a distal end of the nozzle member is faced with the association recess.

9 Claims, 6 Drawing Sheets

5,819,824

CONNECTOR DEVICE FOR LIQUID CRYSTAL CELL

BACKGROUND OF THE INVENTION

This invention relates to a connector device which is connected to an introduction port and/or a suction port of a cell when a liquid crystal is to be filled in the cell.

In order to fill a liquid crystal into a cell, the cell is provided with an introduction port and a suction port. An internal space of the cell is evacuated by vacuum through the suction port, and in that state, the liquid crystal is introduced into the internal space of the cell through the introduction port.

As one method for introduction of a liquid crystal, there is a method, as disclosed in Japanese Patent Application Laid-Open No. 141516/87, in which a liquid crystal is introduced into the internal space of the cell with a portion of the cell, where the introduction port is formed, dipped into the liquid crystal. This method, however, has such inconveniences that since the liquid crystal tends to adhere to a wide range of area around the introduction port of the cell, the liquid crystal is wastefully consumed and the work for wiping off the liquid crystal requires much time and labor.

In another method as disclosed in Japanese Patent Application Laid-Open No. 37529/89, connector devices are attached respectively to an introduction port and a suction port, an internal space of a cell is evacuated by vacuum through one of the connector devices, and a liquid crystal is introduced into the internal space through another connector either under a normal pressure or under an increased pressure in accordance with necessity. This method, indeed, makes it possible to avoid adhesion of the liquid crystal over a wide range of area. However, this publication fails to disclose a detailed construction of the connector device.

Another connector device, which can be connected to an introduction port of a cell with a favorable sealability, is described in U.S. patent application filed on Feb. 5, 1996 by inventors including the inventor of the present application. The U.S. application just mentioned above is based on Japanese Patent Application Laid-Open No. 244290/95.

In a cell of the recent time, an edge portion of one substrate extends beyond an edge portion of the other substrate. A number of pixel control terminals are formed on the edge portion of the one substrate. As a consequence, the edge portion of the cell is essentially defined as a stepped portion. A detailed construction of a connector device to be connected to an introduction port and/or a suction port formed at the stepped edge portion is proposed by none of the prior art.

SUMMARY OF THE INVENTION

It is, therefore, an object of the present invention to provide a connector device which can be connected to a port formed at a stepped edge portion of a cell with a favorable sealability.

According to the present invention, there is provided a connector device to be connected to a port of a cell for a liquid crystal, the cell having an edge portion formed as a stepped portion, the stepped portion including first, second and third receiving surfaces, the first and second receiving surfaces being parallel to each other, the third receiving surface being formed at a boundary between the first receiving surface and the second receiving surface and substantially orthogonal to the first and second receiving surfaces, the port being formed in the third receiving surface, the connector device comprising a connector unit, the connector unit comprising:

(a) a body including a receiving recess and a communication passageway leading to the receiving recess;

(b) an elastic seal member including a base portion received in the receiving recess of the body and a projection projecting from the body, the projection having a stepped portion, the stepped portion having a first and a second abutment surface substantially parallel to each other and a third abutment surface formed at a boundary between the first abutment surface and the second abutment surface and substantially orthogonal to the first and second abutment surfaces, the first abutment surface being located in a more protruded position than the second abutment surface, an association recess being formed in the third abutment surface, in a state where the connector device is connected to the cell, the first, second and third abutment surfaces being brought into abutment respectively with the first, second and third receiving surfaces, and the association recess being faced and communicated with the port of the cell; and (c) a nozzle member extending through the seal member, one end of the nozzle member being in communication with the communication passageway of the body and the other end thereof being face with the association recess of the seal member.

DETAILED DESCRIPTION OF THE EMBODIMENTS

Figure 1:
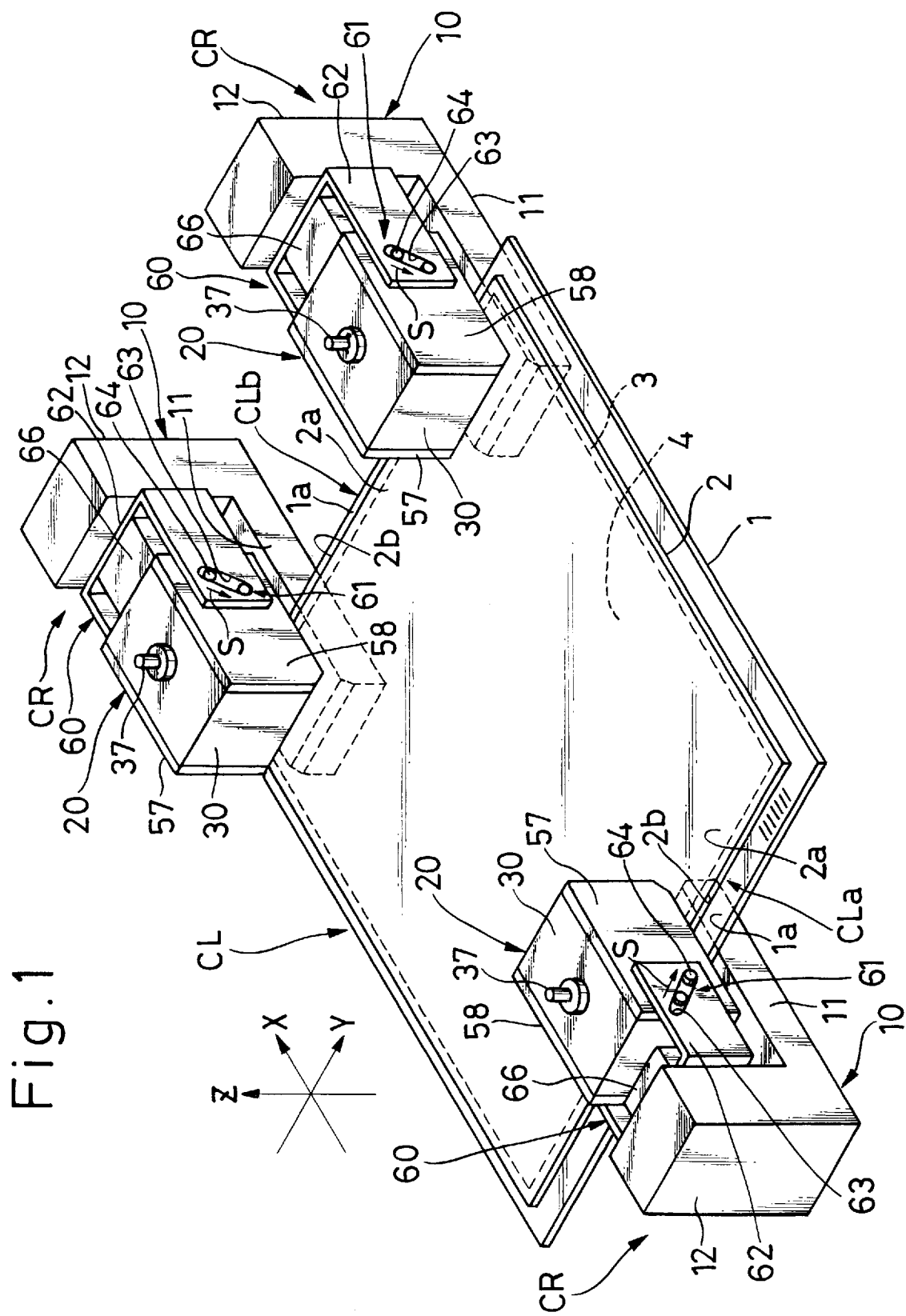
FIG. 1 is a perspective view showing a state in which a plurality of connector devices according to a first embodiment of the present invention are connected to an introduction port and suction ports of a cell.
Figure 3:
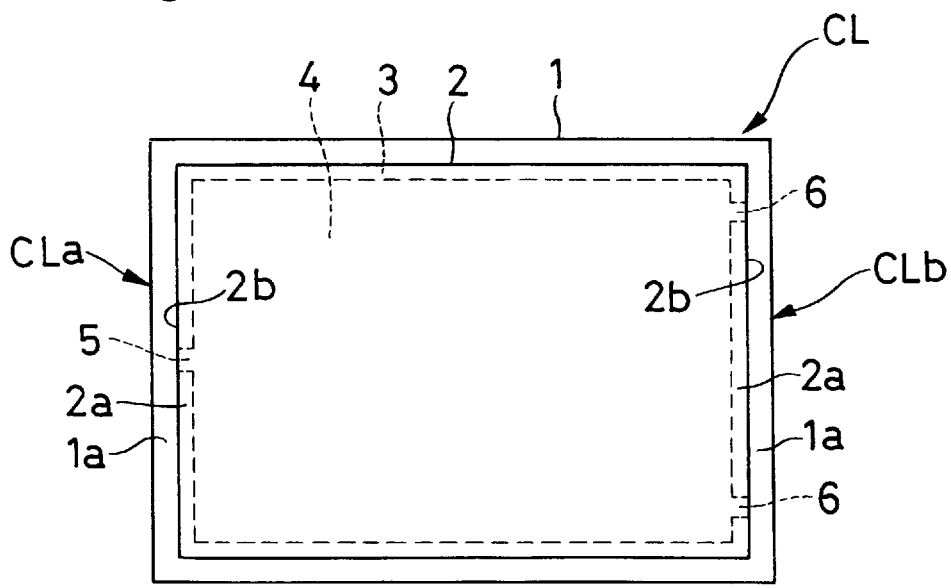
FIG. 3 is a plan view of the above cell.

Before proceeding to the description of a connector device according to one embodiment of the present invention, a cell will be described. As best shown in FIGS. 1 and 3, this cell CL includes first and second rectangular substrates 1, 2 which are made of transparent material such as, for example, glass. The first substrate 1 is analogous to but larger in area than the second substrate 2. A peripheral edge of the second substrate 2 is adhered, by an adhesive layer 3, to that part of the first substrate 1 which is located internally of the peripheral edge of the first substrate 1. An internal space 4 having a micro-thickness (about 5 μm) is defined by the first and second substrates 1 and 2 and the adhesive layer 3. The adhesive layer 3 is physically discontinued at a central part of one peripheral edge portion CLa, and this central part serves as an introduction port 5. The adhesive layer 3 is physically discontinued at two parts of an opposite peripheral edge portion CLb of the cell CL with respect to the portion CLa, and these parts serve as suction ports 6.

Since the peripheral edge portion of the first substrate 1 extends outwardly of the peripheral edge portion of the second substrate 2, all of the edge portions including the edge portions CLa and CLb of the cell CL are formed as a stepped portion. Especially, at the edge portions CLa and CLb where the ports 5 and 6 are formed respectively, an upper surface of the first substrate 1 is provided as a first receiving surface 1a as later described, an upper surface of the second substrate 2 is provided as a second receiving surface 2a, and an edge surface of the second substrate 2 is provided as a third receiving surface 2b. The first and second receiving surfaces 1a and 2a are in parallel relation with each other, whereas the third receiving surface 2b is orthogonal to the first and second receiving surfaces 1a and 2a.

The connector device will now be described in detail. As shown in FIG. 1, connector devices CR are connected to the introduction port 5 and the suction ports 6 of the cell CL at the time for filling a liquid crystal in the cell CL. Each connector device CR includes a connector base 10, a connector unit 20 movably supported on the connector base 10, and a moving mechanism 60 (mover means) for moving the connector unit 20.

Figure 2:
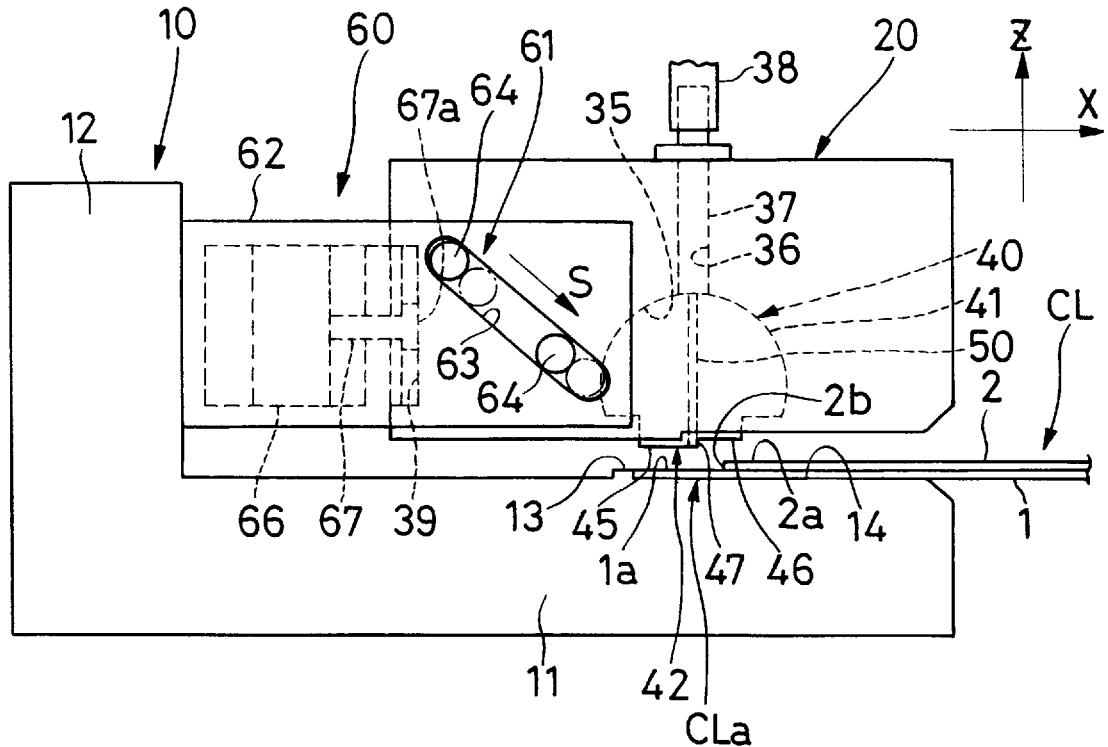
FIG. 2 is a side view showing a state before one of the connector devices is connected to the introduction port of the cell.
Figure 4:
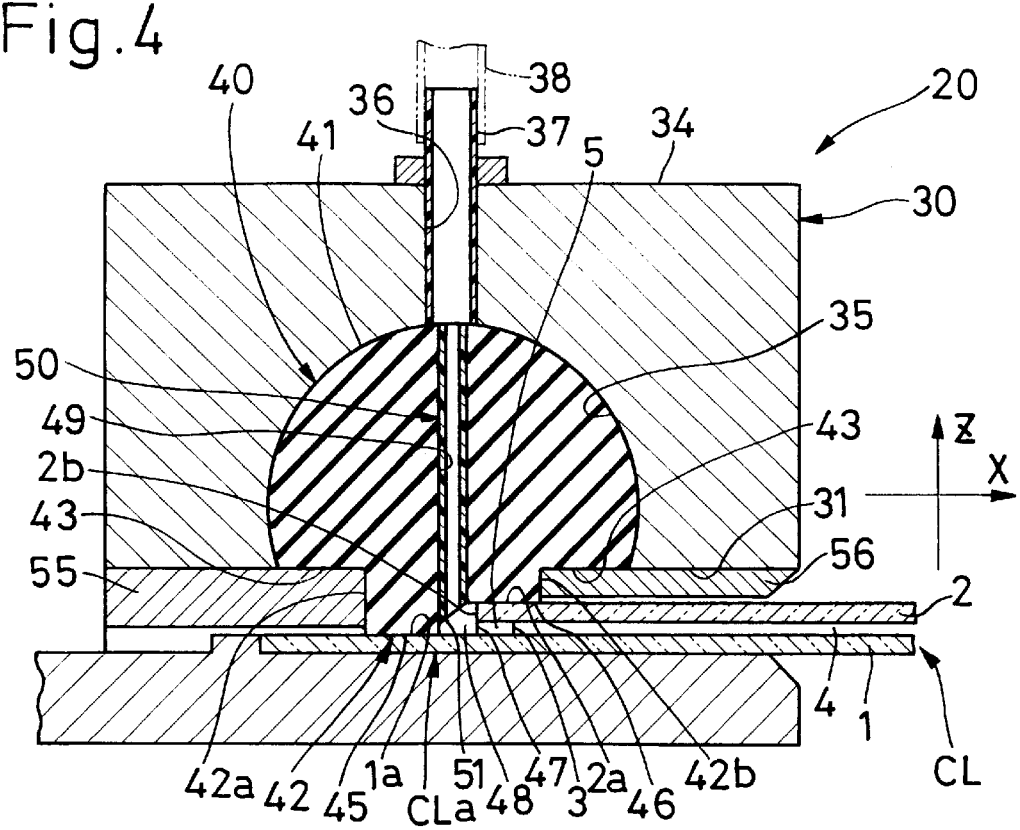
FIG. 4 is an enlarged sectional view of a main portion showing a state in which the connector device is connected to the introduction port of the cell, an adhesive layer and a thickness of an internal space of the cell being shown in an exaggerated manner in this Figure.

For the sake of convenience for explanation, X-, Y-, and Z-axes are shown in FIGS. 1, 2 and 4. The X- and Y-axes are horizontal axes intersecting each other at right angles, whereas the Z-axis is a vertical axis.

As shown in FIGS. 1 and 2, each connector base 10 includes a first wall 11 extending in the X-axis direction and a second wall 12 extending in the Z-axis direction. Thus, the connector base 10 exhibits a generally L-shaped configuration in section. As shown in FIG. 2, the connector base 10 is provided on an upper surface of the first wall 11 with a positioning projection 13 extending in the Y-axis direction (normal direction to the paper surface of FIG. 2). An upper surface of the first wall 11 located forwardly of the positioning projection 13 is formed as a flat support surface 14.

Figure 5:
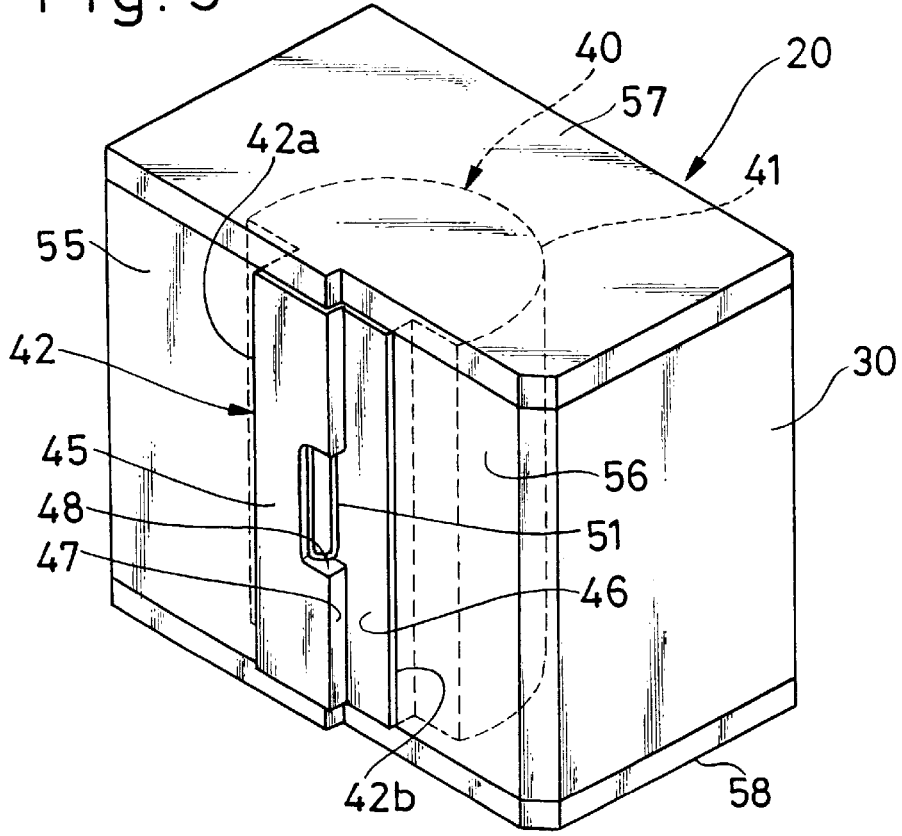
FIG. 5 is a perspective view of the main portion of the connector device when viewed obliquely from below.
Figure 6:
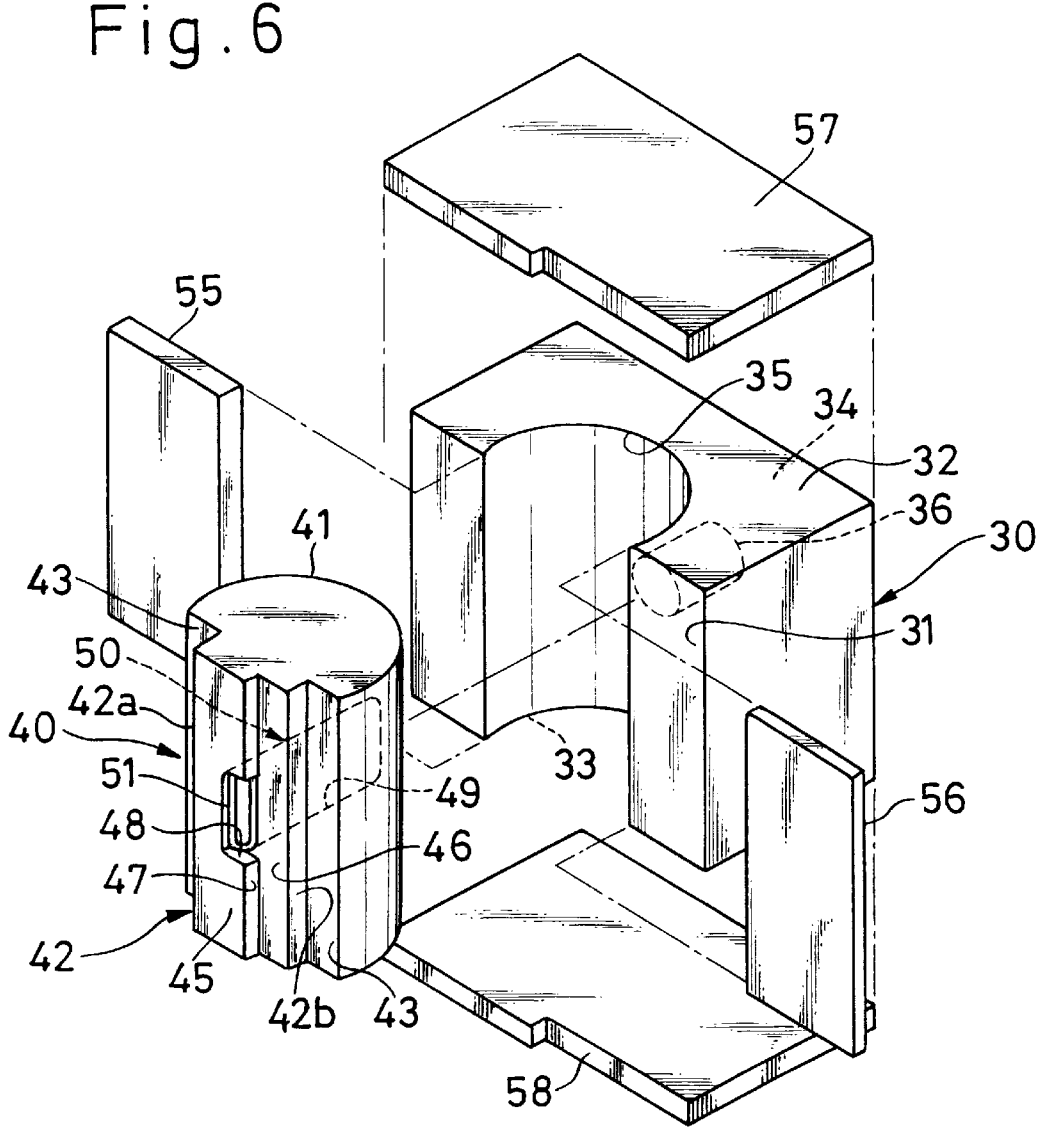
FIG. 6 is an exploded perspective view of the main portion of the connector device when viewed obliquely below.
Figure 7:
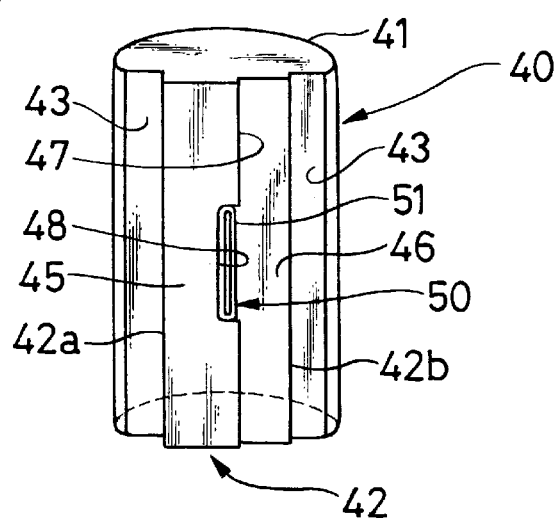
FIG. 7 is a view of a seal member of the connector device when viewed obliquely from below.

As shown in FIGS. 1 and 2, each connector unit 20 has a generally rectangular parallelepiped configuration as a whole. The connector unit 20 is disposed upwardly of the first wall 11 of the connector base 10 in spaced-apart and opposing relation. As best shown in FIGS. 4 through 6, the connector unit 20 includes a body 30. This body 30 is made of material having rigid properties such as metal and hard resin and exhibits a generally rectangular parallelepiped configuration. A receiving recess 35 is formed in a lower surface 31 (i.e., the surface facing the first wall 11 of the base 10) of the body 30. This receiving recess 35 extends in the Y-axis direction (normal direction to the paper surface of FIGS. 2 and 4) and is also opened at two surfaces 32 and 33 of the body 30, the surfaces 32 and 33 being faced with each other in the Y-axis direction. The receiving recess 35 has a configuration of a partly cut-away circle 1 in section. A sectional area of the receiving recess 35 is larger than a half of this circle.

The body 30 is provided with a communication passageway 36 extending in the Z-axis direction. One end of the communication passageway 36 is opened at an inner peripheral surface of the receiving recess 35, and the other end thereof is opened at a surface 34 faced with the surface 31 of the body 30. A joint 37 is inserted into the communication passageway 36. A tube 38 is connected to the joint 37. The joint 37 and a tube 38 are made of fluororesin.

The joint 37 of the connector device CR to be connected to the introduction port 5 is connected with a liquid crystal supply source (not shown) through the tube 38. The joint 37 of the connector device CR to be connected to the suction port 6 is connected with a vacuum device (not shown) through the tube 38.

A seal member 40 made of elastic material such as elastically deformable fluororesin and soft plastic is received in the receiving recess 35 of the body 30. This seal member 40 includes a base portion 41 having a generally cylindrical configuration and extending in the Y-axis direction. The base portion 41 has a sectional configuration somewhat larger than that of the receiving recess 35 and is fitted into the receiving recess 35 under pressure.

A projection 42 projecting toward the first wall 11 of the connector base 10 is formed on the base portion 41 of the seal member 40. This projection 42 extends in the Y-axis direction, i.e., in a longitudinal direction of the base portion 41. The projection 42 has a stepped portion at one side thereof. The stepped portion of the projection 42 provides a first abutment surface 45, a second abutment surface 46 and a third abutment surface 47. The first abutment surface 45 and the second abutment surface 46 are parallel to the support surface 14 of the connector base 10. The first abutment surface 45 projects closer to the first wall 11 than the second abutment surface 46. The third abutment surface 47 is formed at the boundary between the first abutment surface 45 and the second abutment surface 46 and orthogonal to the first and second abutment surfaces 45 and 46. The third abutment surface 47 is elongated in the Y-axis direction and parallel to the positioning projection 13 of the connector base 10. In a natural state of the seal member 40, the width of the third abutment surface 47 (i.e., the height from the second abutment surface 46 to the first abutment surface 45) is equal to the width of the third receiving surface 2b of the cell CL (i.e., the height from the first receiving surface 1a to the second receiving surface 2b).

An association recess 48 is formed in a central part of the third abutment surface 47 of the seal member 40. A through-hole 49 extending in a direction perpendicular to a longitudinal direction of the seal member 40 is formed in the seal member 40. This through-hole 49 has a compressed configuration in section. One end of the through-hole 49 is mated with the association recess 48. The other end of the through-hole 49 is opened at a central part of a peripheral surface of the base portion 41 and communicated with the communication passageway 36.

A nozzle member 50 having a compressed configuration in section and made of fluororesin is fixedly fitted into the through-hole 49 under pressure. The nozzle member 10 extends in the Z-axis direction, i.e., in a direction orthogonal to the support surface 14 of the connector base 10, and is communicated with the joint 37. A distal end 51 of the nozzle member 50 projects within the association recess 48 and is cut diagonally. This distal end 51 of the nozzle member 50 is located in a retreated position with respect to the first abutment surface 45 and the third abutment surface 47.

As shown in FIGS. 4 and 6, the base portion 41 of the seal member 40 has a pair of flat surfaces 43 arranged respectively on opposite sides of the projection 42. The flat surfaces 43 lie in the same plane. In a state where the base portion 41 is received in the receiving recess 35, the flat surfaces 43 are flush with the surface 31 of the body 30.

The seal member 40 is supported on the body 30 in a stable manner through four retaining plates 55 through 58. That is, the retaining plates 55, 56 are secured to the surfaces 31 of the body 50 which are located on opposite sides of the receiving recess 35. The retaining plates 55, 56 are adapted to retain the pair of flat surfaces 43 of the seal member 40, respectively. Side edges of the retaining plates 55, 56 are also adapted to retain opposite side surfaces 42a, 42b of the projection 42 of the seal member 40. Also, the retaining plates 57, 58 are secured to the opposing surfaces 32, 33 of the body 30. The retaining plates 57, 58 are adapted to retain opposite end faces of the seal member 40.

In the state where the seal member 40 is retained by the retaining plates 55, 56 as mentioned above, the first abutment surface 45 and the second abutment surface 46 project respectively from the retaining plates 55, 56 toward the first wall 11. The retaining plate 55 is thicker than the retaining plate 56. A projecting amount of the first abutment surface 45 from the retaining plate 55 is generally equal to a projecting amount of the second abutment surface 46 from the retaining plate 56. Thus, the projecting amount of the first abutment surface 45 is appropriate.

The moving mechanism 60 will now be described in detail. This moving mechanism 60 includes a guide mechanism 61 (guide means) and an air-cylinder (driver means). The guide mechanism 61 has a generally U-shaped bracket 62 secured to the second wall 12 of the connector base 10. Elongated guide holes 63 (guide portion) are formed respectively in a pair of opposing walls of the bracket 62. An extending direction of each guide hole 63 is inclined about 45 degrees with respect to the X-axis direction and the Z-axis direction, so that the guide hole 63 comes closer to the first wall 11 as they go more toward forwardly of the first wall 11. This inclination direction is represented by S in FIGS. 1 and 2.

The connector unit 20 is disposed between and supported by the pair of walls of the bracket 62. More specifically, two pins 64 (engagement portion) are provided on each of the retaining plates 57, 58 which are disposed on the opposite sides of the connector unit 20. By fitting the pins 64 into the guide holes 63 respectively, the connector unit 20 is supported for sliding in the S-direction.

As shown in FIGS. 1 and 2, an air cylinder 66 is secured to the second wall 12 of the connector base 10 through the bracket 62 such that the air cylinder 66 is arranged between the second wall 12 and the connector unit 20. The air cylinder 66 has a rod 67 extending in the X-axis direction. A disk portion 67a of a large diameter is formed on a distal end of the rod 67. This disk portion 67a is slidably received in a groove 39 having a generally T-shaped configuration in section. The groove 39 is formed in a surface facing the second wall 12 at the body 30 of the connector unit 20. Since the groove 39 extends in the Z-axis direction, the connector unit 20 can move in the Z-axis direction with respect to the rod 67. Accordingly, the connector unit 20 can slide in the S-direction.

Next, the steps for filling a liquid crystal in the cell CL with the use of the connector device CR will be described. First, as shown in FIGS. 1 and 2, three connector devices CR are moved toward the cells CL set in pre determined position by driving mechanisms (not shown) connected to the connector bases 10, respectively. By this, the connector bases 10 of the connector devices CR are set respectively to the edge portions CLa and CLb where the introduction ports 5 and the suction port 6 of the cell CL are formed. At that time, the first substrate 1 of each cell CL is brought into abutment with the support surface 14 and the positioning projection 13 is brought into contact with the edge of the first substrate 1. By doing this, the connector bases 10 are correctly positioned.

Operation of the connector device CR to be connected to the introduction port 5 will now be described. This operation is likewise applicable to the connector devices CR to be connected to the suction ports 6. As shown in FIG. 2, in the state where the connector bases 10 of the connector device CR are correctly positioned, the rod 67 of the air cylinder 66 is in a retreated position and the connector unit 20 is away from the edge portion CLa of the cell CL.

Then, the air cylinder 66 is actuated to push the rod 67 forwardly in parallel to the cell CL, i. e., along the X-axis direction. By doing this, the connector unit 20 is pushed forwardly. As a consequence, due to guiding actions of the guide holes 63 and the pins 64, the connector unit 20 is moved in the S-direction and comes closer to the edge portion CLa of the cell CL from a slantwise direction. For movement of the connector unit 20, the first and second abutment surfaces 45 and 46 are maintained their parallel relation to the cell CL.

As a result of the movement of the connector unit 20 from the slantwise direction, the seal member 40 is urged against the edge portion CLa of the cell CL with an elastic deformation. That is, as shown in FIG. 4, the first abutment surface 45 of the seal member 40 is elastically intimately contacted with the first receiving surface 1a (upper surface of the edge portion of the first substrate 1) of the cell CL, the second abutment surface 46 is elastically intimately contacted with the second receiving surface 2a (upper surface of the edge portion of the second substrate 2) of the cell CL, and the third abutment surface 47 is elastically intimately contacted with the third receiving surface 2b (surface of the edge of the second substrate 2) of the cell CL. By this, the association recess 48 of the seal member 40 can be sealed tightly with the association recess 48 faced and communicated with the introduction port 5 of the cell CL.

As described above, since the abutment surfaces 45, 46 and 47 of the seal member 30 are brought closer to the edge portion CLa of the cell CL from the slantwise direction, the abutment surfaces 45, 46 and 47 can all be simultaneously brought into intimate contact with the corresponding receiving surfaces 1a, 2a and 2b of the cell CL irrespective of the fact that the first and second abutment surfaces 45, 46 are orthogonal to the third abutment surface 47. Further, since the connector unit 20 is urged from the slantwise direction under the effect of the air cylinder 66, all of the abutment surfaces 45, 46 and 47 of the seal member 40 can be positively and intimately contacted with the receiving surfaces 1a, 2a and 2b of the cell CL, respectively.

In the above-mentioned sealed state, one end 51 of the nozzle member 50 is in a retreated position from the first and third abutment surfaces 45 and 47 and therefore, the one end 51 does not contact the receiving surfaces 1a, 2b of the cell CL.

Since the projecting height of the first abutment surface 45 of the seal member 40 from the second abutment surface 46 is equal to the projecting height of the second receiving surface 2a of the cell CL from the first receiving surface 1a, these abutment surfaces 45 and 46 can be intimately contacted with the receiving surfaces 1a and 2a with generally equal elastic forces.

The retaining plate 55 for retaining the side surface 42a of the projection 42 is thicker than the retaining plate 56. Owing to this feature, a projecting amount of the projection 42 from the retaining plate 56 can be limited to an appropriate value. As a consequence, the retaining plate 55 can prohibit the projection 42 from being elastically deformed in such a way as to escape from the third receiving surface 2b when the projection 42 is elastically deformed. Therefore, the third abutment surface 47 of the seal member 40 can be intimately contacted with the third receiving surface 2b with a sufficient amount of elastic force.

After the connector devices CR have been connected to the introduction port 5 and the suction ports 6 in the manner as described, the vacuum device is driven to discharge the air in the internal spaces 4 of the cells CL through the suction ports 6 and the association recesses 48, nozzle members 50, joints 37 and tubes 38 of the connector devices CR connected to the suction ports 6.

When the internal space 4 of each cell CL has reached a predetermined degree of vacuum, a valve (not shown) provided on the tube 38 of the connector device CR on the introduction port 5 side is opened. As a consequence, a liquid crystal, which has been pressurized to a level of several times a normal atmospheric pressure, is supplied from the liquid crystal supply source to the connector device CR through the tube 38.

This liquid crystal is discharged into the association recess 48 via the nozzle member 50 and then supplied into the internal space 4 from the introduction port 5 of the cell CL. At that time, since the association recess 48 is tightly sealed with respect to outside, the liquid crystal does not leak outside.

After the supply of liquid crystal into the internal space 4 is over, the air cylinders 66 in all of the connector devices CR are actuated to cause the rods 67 to be retreated, so that the connector units 20 are returned slantwise backwardly to the original positions. As a consequence, the seal members 40 of the connector devices CR are separated respectively from the edge portions CLa, CLb of the cell CL.

When the liquid crystal is filled in the cells CL in the manner as described, the liquid crystal tends to adhere to only the surface of the cell CL facing the association recesses 48. Accordingly, an adhering amount of liquid crystal can considerably be reduced compared with the conventional filling device. Thus, expensive liquid crystal can be prevented from being wastefully consumed. In addition, any adhered crystal can easily be wiped off.

In all of the connector devices CR, three abutment surfaces 45, 46 and 47 of the seal members 40 can be positively and intimately contacted with three receiving surfaces 1a, 2a and 2b of the cell CL. As a consequence, in the connector device CR on the introduction port 5 side, the liquid crystal can positively be prevented from leaking, whereas in the connector devices CR on the suction ports 6 side, evacuation can reliably be performed.

In the description of the construction and operation hereinbefore made, a description is made, for the sake of easy understanding, on a case where the connector devices CR are connected in the state that the cell CL is arranged in its horizontal posture. However, when a mass production is required, it is preferred that the connector devices CR are connected in the state that a number of cells CL are arranged in their vertical postures in array.

In the first embodiment, the means for guiding the connector unit 20 in a slantwise direction may be a pin provided on the bracket 62 and a guide groove formed in the connector unit 20. Similarly, this guide means may be a parallel link mechanism for connecting the connector unit 20 and the connector base 10 to each other.

In the first embodiment, it is good enough that the distal end of the rod of the air cylinder 66 merely contacts the connector unit 20. In that case, there is a need of a provision of a return spring for connecting the connector unit 20 and the connector base 10 to each other. When the rod proceeds forwardly, the connector unit 20 moves slantwise toward the cell against the return spring and when the rod is retreated, the connector unit 20 is returned back to the original position by the return spring.

A connector device according to a second embodiment of the present invention will now be described with reference to FIGS. 8 and 9. This second embodiment is different from the first embodiment only with respect to a mechanism 70 for moving a connector unit 20. Corresponding component parts of the remaining construction are denoted by identical reference numerals respectively in Figures and description thereof is omitted. The moving mechanism 70 includes a pair of plate-like levers 71 pivotably connected to a connector base 10. A contact unit 20 is secured between upper portions of the levers 71. A receiving plate 72 is connected to and disposed between lower portions of the levers 71. The moving mechanism 70 further includes an air cylinder 75 (driver means) and a return spring 77. The air cylinder 75 is disposed on a first wall 11 of the connector base 10, such that its rod 76 moves upwardly and downwardly. A distal end of the rod 76 is defined as a conical surface 76a. The return spring 77 is disposed between the connector base 10 and the connector units 20.

Figure 8:
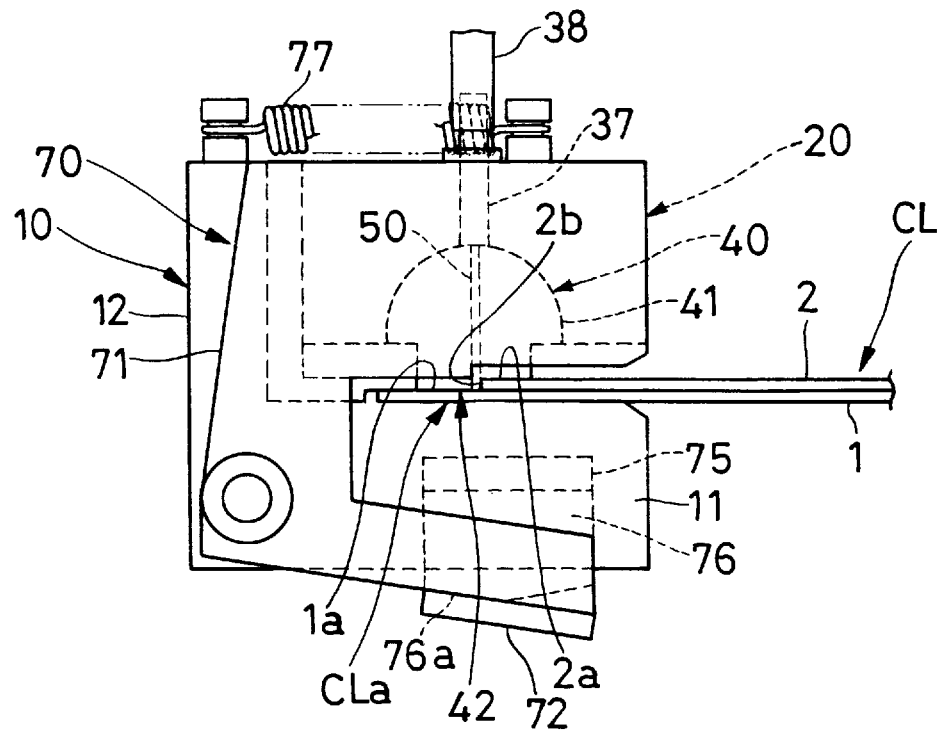
FIG. 8 is a side view showing a state in which a connector device according to a second embodiment of the present invention is connected to an introduction port of a cell.
Figure 9:
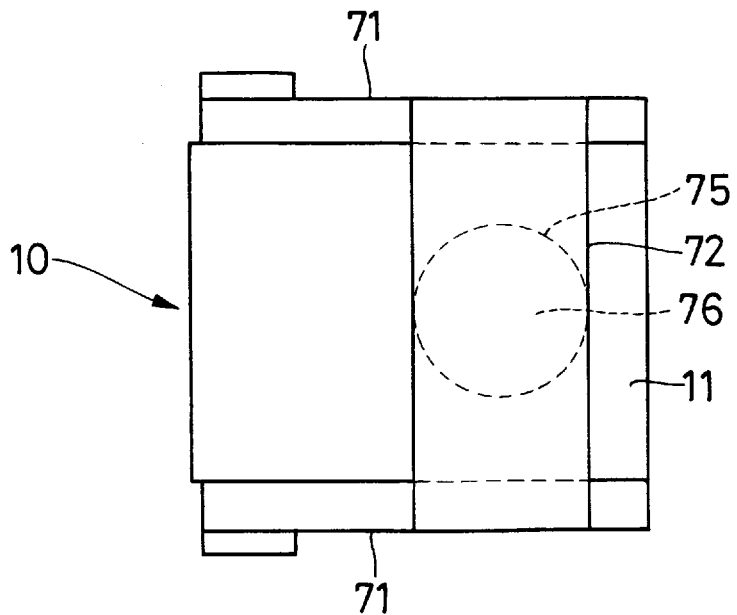
FIG. 9 is a bottom surface view of the above connector device.

In the second embodiment, when the air cylinder 75 is actuated to move the rod 76 downwardly, the distal end of the rod 76 pushes a receiving plate 72 downwardly and the lever 71 is pivoted clockwise in the FIG. 8. As a consequence, the connector unit 20 is moved slantwise toward the cell CL along a pivoting orbit for the lever 71 and a seal member 40 is intimately contacted with an edge portion CLa or CLb of the cell CL in the same manner as in the first embodiment. When the urging force of the air cylinder 75 is removed, the connector unit 20 is returned to the original position under the effect of the return spring and the rod 76 is pushed upwardly by the receiving plate 72 so that the rod 76 is returned to its original position.

Figure 10:
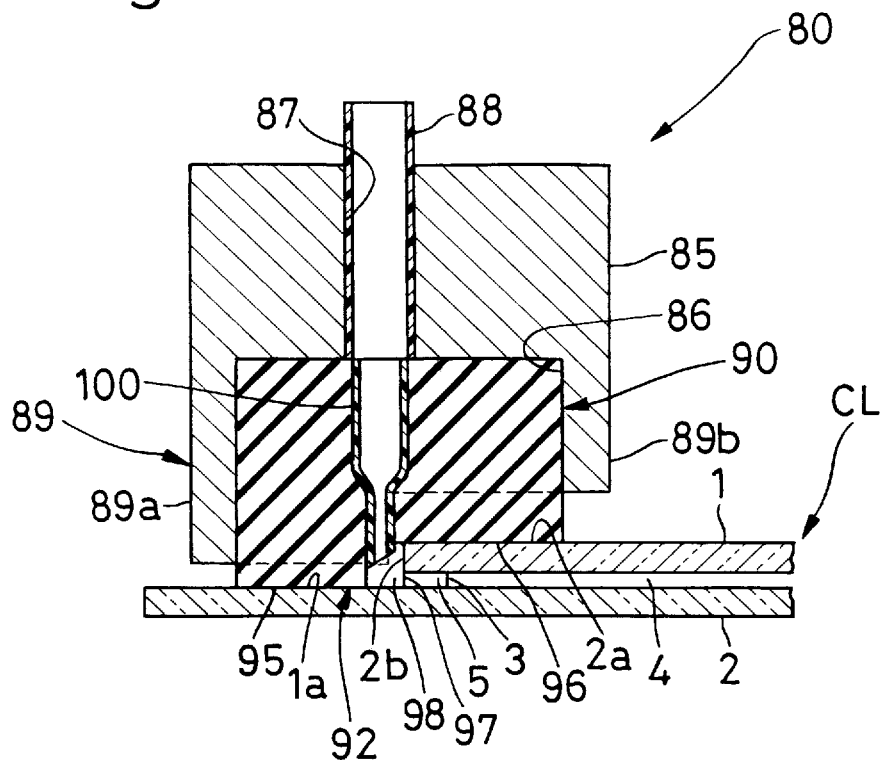
FIG. 10 is a sectional view showing a state in which a main portion of a connector device according to a third embodiment of the present invention is connected to an introduction port of a cell, in this Figure, an adhesive layer and a thickness of an internal space of the cell being shown in an exaggerated manner.
Figure 11:
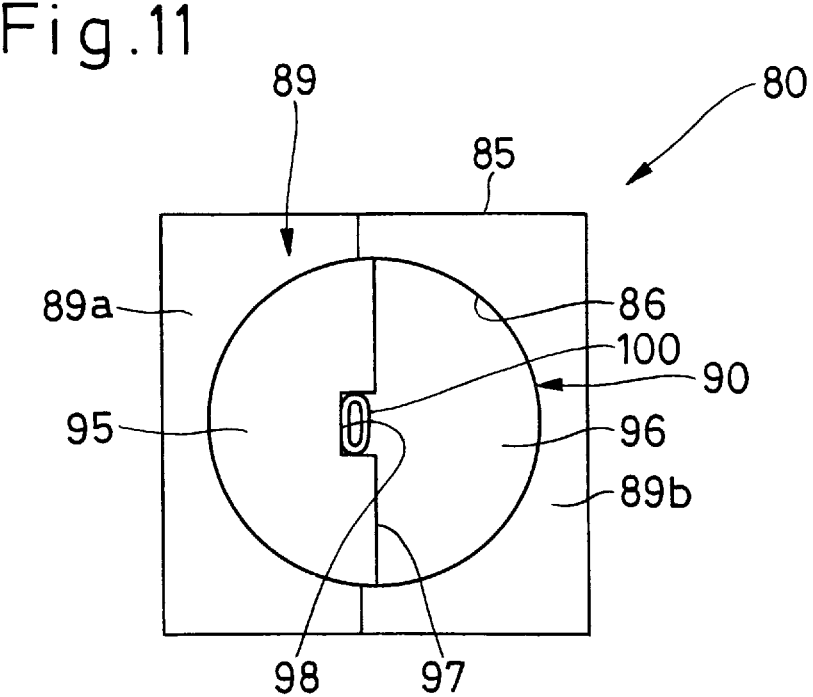
FIG. 11 is a bottom view of the main portion of the above connector device.

A connector device according to a third embodiment of FIGS. 10 and 11 comprises a different connector unit 80 from those of the first and second embodiments. Since the remaining construction such as a moving mechanism, a connector base, etc. is the same as the first and second embodiment, illustration thereof is omitted. The connector unit 80 includes a body 85 and a seal member 90. The body 85 has a generally rectangular parallelepiped configuration. A circular receiving recess 86 in section is formed in a lower surface of the body 85. The body 85 is provided with a communication passageway 87 leading to the receiving recess 86. A joint 88 is fitted to the communication passageway 87.

The seal member 90 has a column-like configuration and is fitted into the receiving recess 86. A stepped projection 92 is formed on a lower surface of the seal member 90. This projection 92 includes, as in the case with the embodiments hereinbefore described, a first abutment surface 95, a second abutment surface 96 and a third abutment surface 97. An association recess 98 is formed in a central part of the third abutment surface 97. A nozzle member 100, whose distal end projects in the association recess 98, extends through the seal member 90. This nozzle member 100 extends in a direction orthogonal to the cell CL and is communicated with the communication passageway 87.

The body 85 includes a peripheral wall 89 which defines the receiving recess 86 and surrounds the seal member 90 over an entire periphery thereof. The peripheral wall 89 includes a wall portion 89a for surrounding a large area of a part of the seal member 90 where the first abutment surface 95 is formed, and a wall portion 89b for surrounding a part where the second abutment surface 96 is formed. The wall portion 89a is higher than the wall portion 89b, so that a projecting amount of the first abutment surface 95 from the wall portion 89a can be limited to an appropriate value. Accordingly, the wall portion 89a prevents the seal member 90 from being elastically deformed such that the seal member 90 escapes from the third receiving surface 2b of the cell CL when the seal member 90 is urged against the cell CL with the elastic deformation. As a consequence, the third abutment surface 97 can positively be intimately contacted with the third receiving surface 2b.

In all of the embodiments so far described, the connector device of the present invention may be connected to only the introduction port. In that case, different connector devices from that of the present invention are connected to the suction ports, or the cell is received in a vacuum vessel without connecting any connector device to the suction ports.

The connector devices of the present invention may be connected to only the suction ports. Especially, in case that the edge portions of the cells, where the suction ports are formed, do not have a stepped portion, a connector device to be connected to the introduction port becomes different from that of the present invention. For example, a connector device according to U.S. patent application (filed Feb. 5, 1996) proposed by the present applicants is used.

What is claimed is:

1. A connector device to be connected to a port of a cell for a liquid crystal, said cell having an edge portion formed as a stepped portion, said stepped portion including first, second and third receiving surfaces, said first and second receiving surfaces being parallel to each other, said third receiving surface being formed at a boundary between said first receiving surface and said second receiving surface and substantially orthogonal to said first and second receiving surfaces, said port being formed in said third receiving surface, said connector device comprising a connector unit, said connector unit comprising:

(a) a body including a receiving recess and a communication passageway leading to said receiving recess;

(b) an elastic seal member including a base portion received in said receiving recess of said body and a projection projecting from said body, said projection having a stepped portion, said stepped portion having a first and a second abutment surface substantially parallel to each other and a third abutment surface formed at a boundary between said first abutment surface and said second abutment surface and substantially orthogonal to said first and second abutment surfaces, said first abutment surface being located in a more protruded position than said second abutment surface, an association recess being formed in said third abutment surface, in a state where said connector device is connected to said cell, said first, second and third abutment surfaces being brought into abutment respectively with said first, second and third receiving surfaces, and said association recess being faced and communicated with said port of said cell; and (c) a nozzle member extending through said seal member, one end of said nozzle member being in communication with said communication passageway of said body and the other end thereof being face with said association recess of said seal member.

2. A connector device according to claim 1, wherein a height of said first abutment surface from said second abutment surface of said seal member is substantially equal to a height of said second receiving surface from said first receiving surface of said cell.

3. A connector device according to claim 1, wherein said base portion of said seal member has a column-like configuration extending in parallel to said third receiving surface of said cell, said projection being formed on a part of a peripheral surface of said column-like base portion, said projection extending in a longitudinal direction of said base portion, said nozzle member extending in a direction perpendicular to the longitudinal direction of said base portion and orthogonal to said first and second receiving surfaces, a pair of flat surfaces being formed on said base portion such that said flat surfaces are located respectively on opposite sides of said projection and lie in the same plane, a first and a second retaining plates being secured to said body, said first and second retaining plates being abutted with said pair of flat surfaces of said base portion to support said base portion, a side edge of said first retaining plate being abutted with a side surface of a part of said projection where said first abutment surface is formed and a side edge of said second retaining plate being abutted with a side surface of a part of said projection where said second abutment surface is formed, said projection of said seal member projecting from said first and second retaining plates.

4. A connector device according to claim 3, wherein said first retaining plate is thicker than said second retaining plate.

5. A connector device according to claim 1, wherein said body includes a peripheral wall which defines said receiving recess and surrounds said seal member over an entire periphery thereof, a wall portion of said peripheral wall surrounding a part of said seal member where said first abutment surface is formed being higher than another wall portion of said peripheral wall surrounding a part of said seal member where said second abutment surface is formed.

6. A connector device according to claim 1, further comprising a connector base, said connector base having a support surface which contacts a surface of said cell opposite to said first receiving surface, said connector base being provided with mover means, said mover means being adapted to move said connector unit obliquely toward said cell which is in abutment with said connector base, so that said first, second and third abutment surfaces of said seal member are urgedly contacted respectively with said first, second and third receiving surfaces of said stepped portion of said cell.

7. A connector device according to claim 6, wherein said mover means includes driver means for pushing said connector unit in a direction parallel to said cell, and guide means for linearly guiding said connector in a slantwise direction.

8. A connector device according to claim 7, wherein said guide means includes a guide portion and an engagement portion, said guide portion being disposed on one of said connector unit and said connector base and linearly extending in a slantwise direction, said engagement portion being disposed on the remaining one of said connector unit and said connector base and engaged with said guide portion for movement in an extending direction thereof.

9. A connector device according to claim 6, wherein said mover means includes a lever turnably mounted on said connector base, and driver means for turning said lever, said connector unit being mounted on said lever, when said driver means is driven, said connector unit being caused to move in a slantwise direction toward said cell along a turning orbit of said lever.

* * * * *